July 11, 1950
E. J. HILTON
2,515,124
METHOD AND MACHINE FOR MAKING
INVOICES OR CHARGE TICKETS
Filed Aug. 14, 1946
8 Sheets-Sheet 1
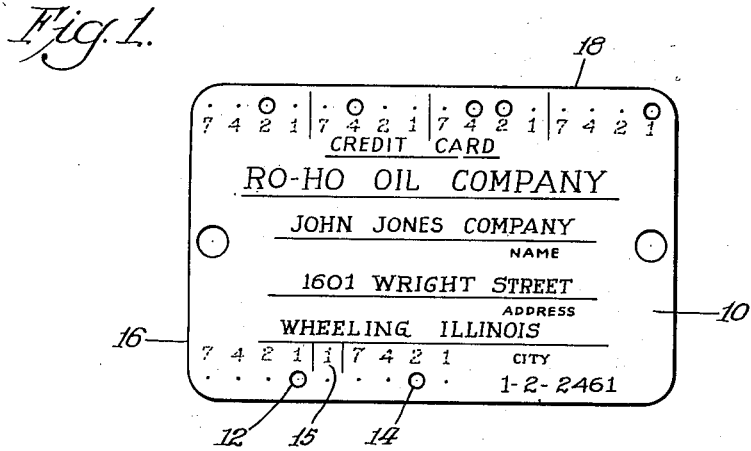
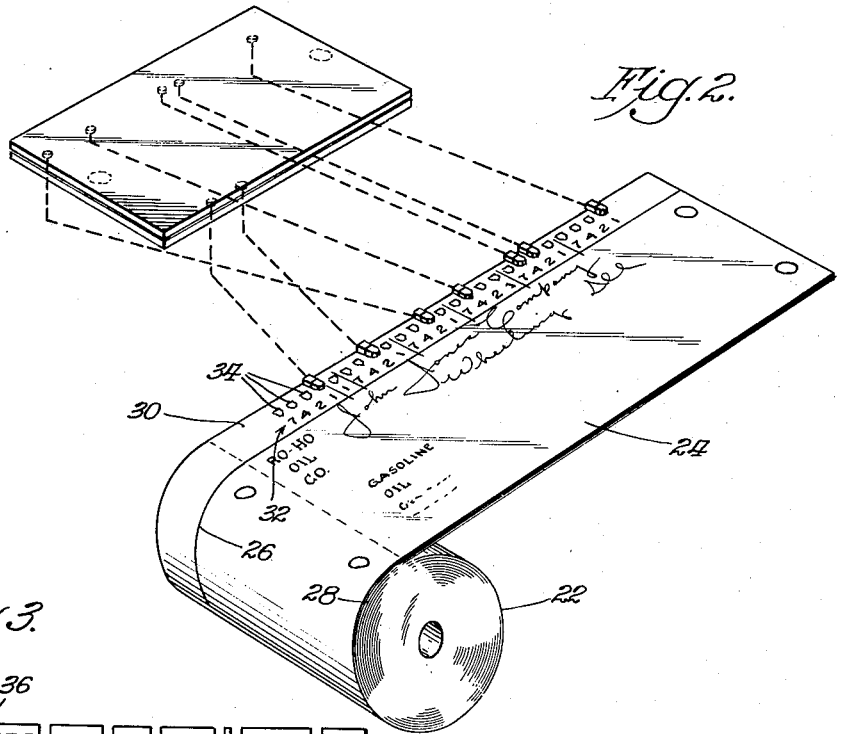
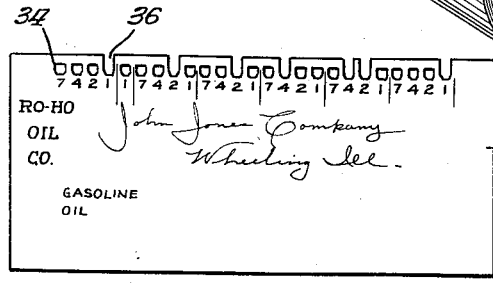
Inventor
Earl John Hilton
By
Stone, Artman & Binny
Attys.

July 11, 1950
E. J. HILTON
2,515,124
METHOD AND MACHINE FOR MAKING INVOICES OR CHARGE TICKETS
Filed Aug. 14, 1946
8 Sheets-Sheet 2
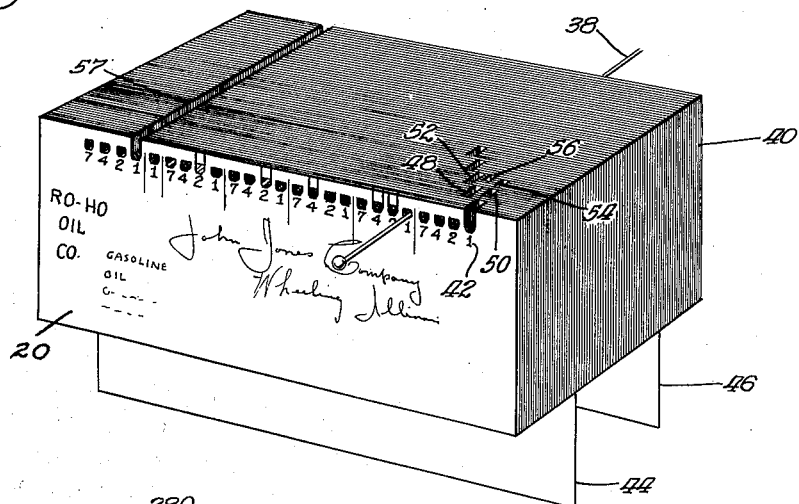
Fig. 4.
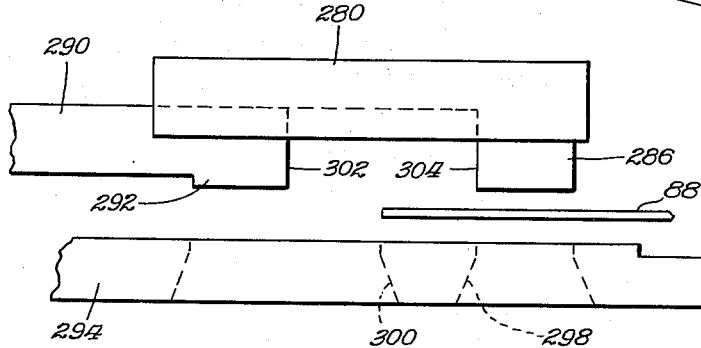
Fig. 9.
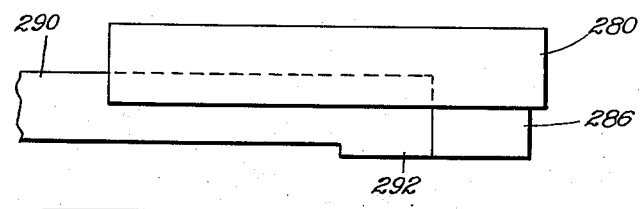
Fig. 10.
Inventor.
Earl John Hilton
By
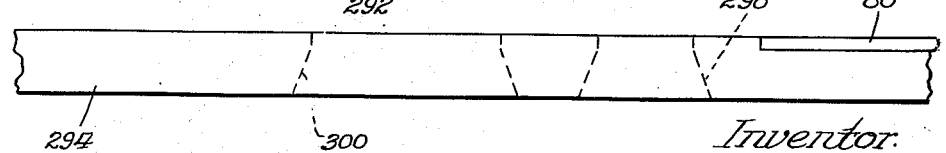
Attys.

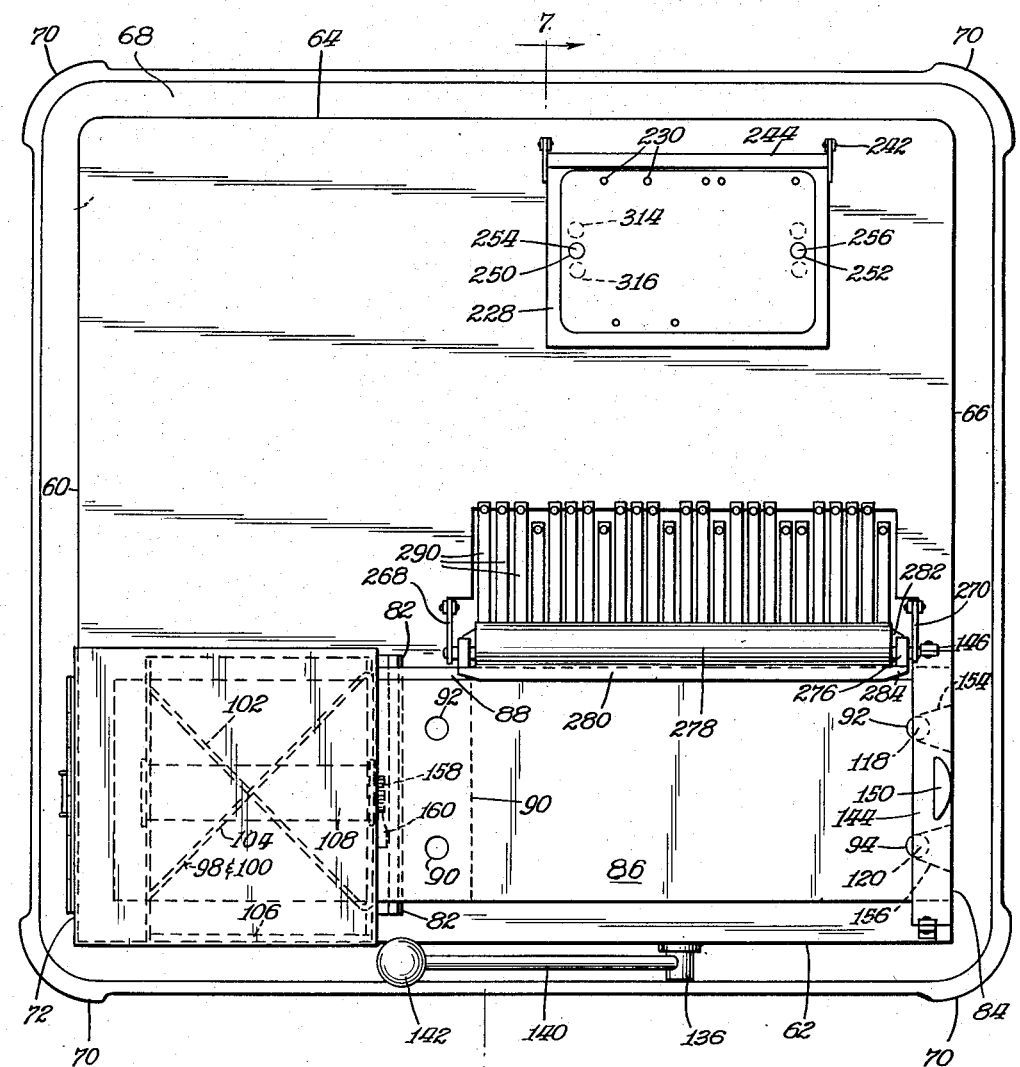

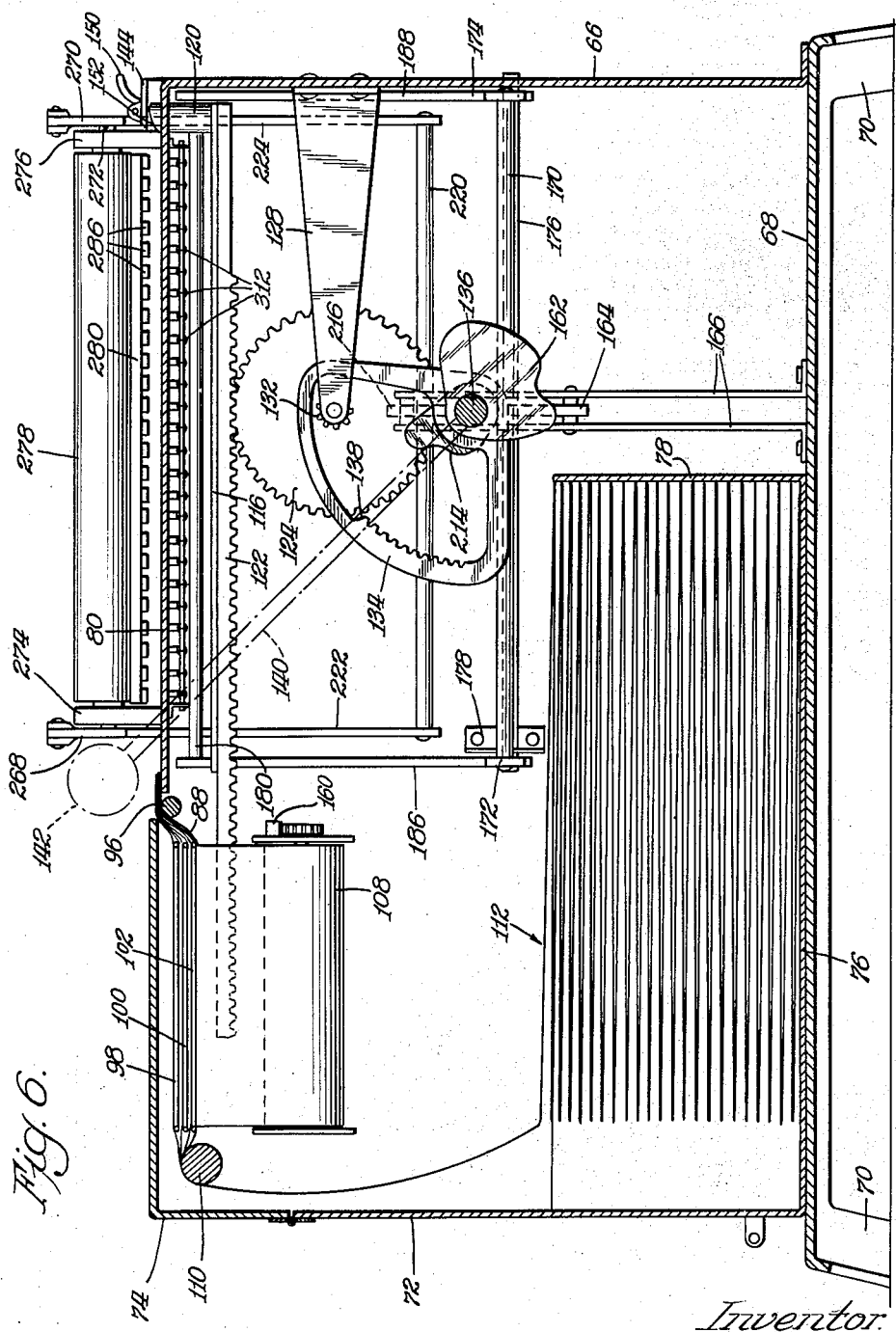

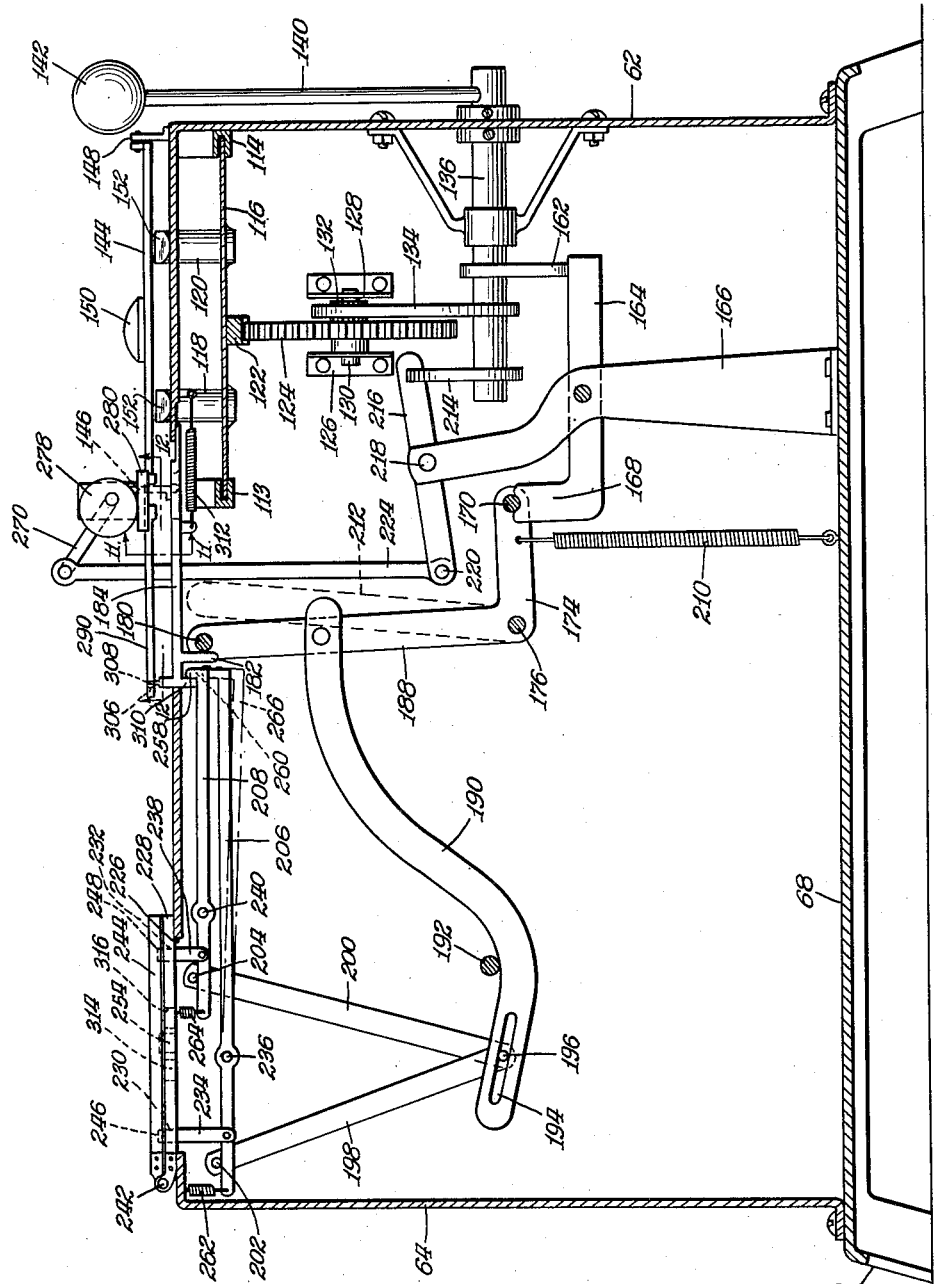

July 11, 1950
E. J. HILTON
METHOD AND MACHINE FOR MAKING
INVOICES OR CHARGE TICKETS
2,515,124
Filed Aug. 14, 1946
8 Sheets-Sheet 6
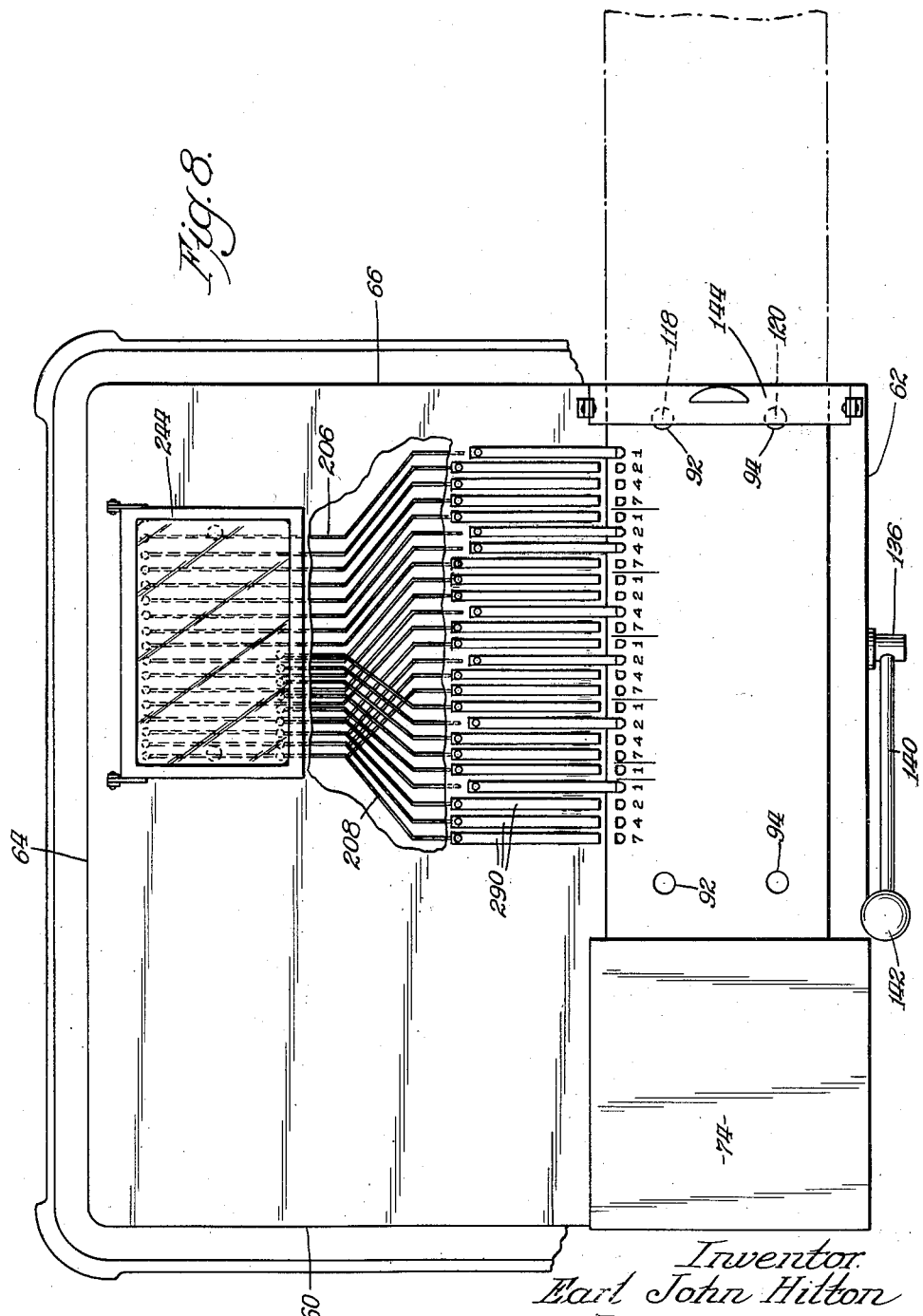
Inventor.
Earl John Hilton
By
Stone, Ailman & Bisson
Attys.

Inventor:
Earl John Hilton
By
Stone, Artman & Bisson
Attys.

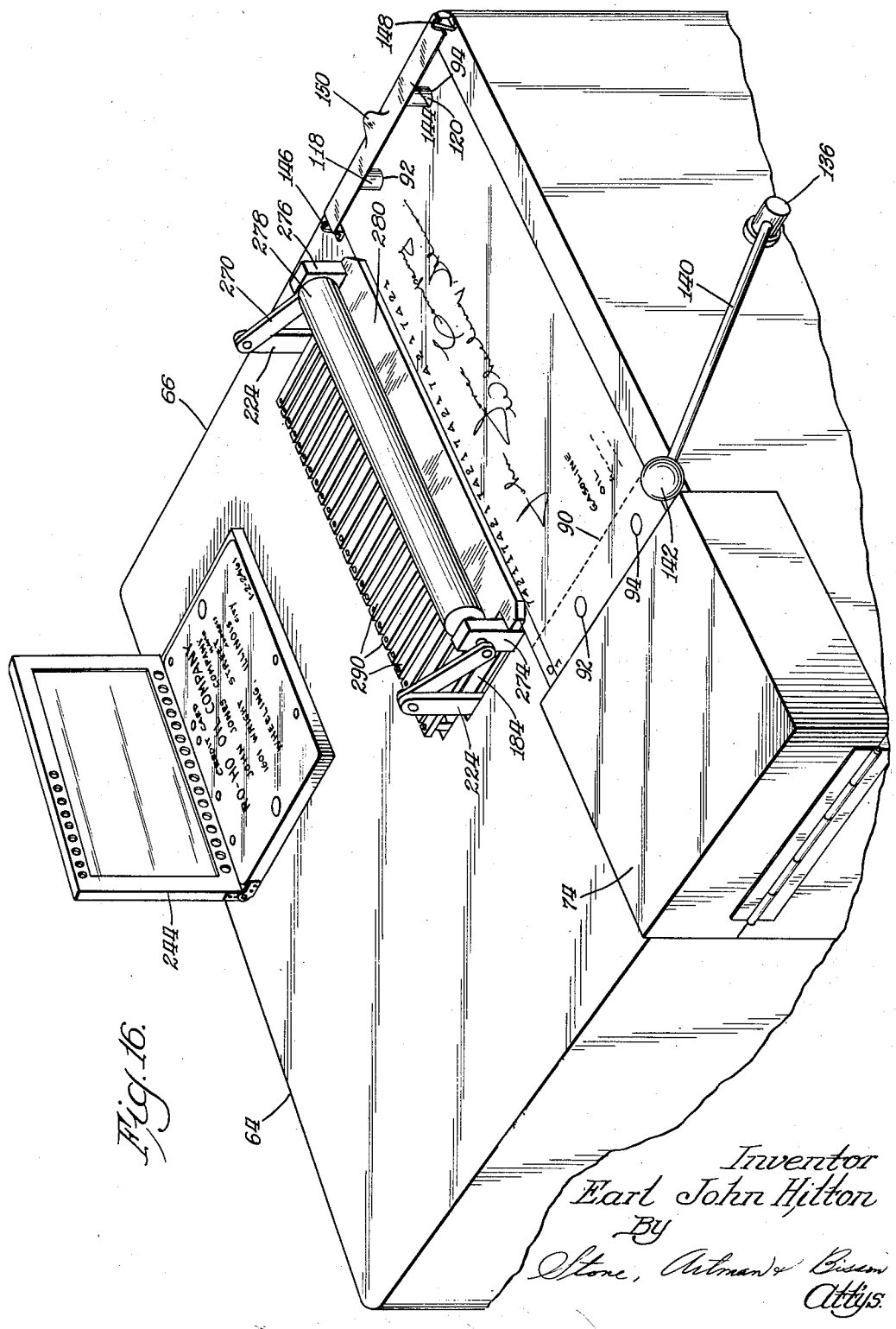

Patented July 11, 1950

2,515,124

UNITED STATES PATENT OFFICE 2,515,124

METHOD AND MACHINE FOR MAKING INVOICES OR CHARGE TICKETS

Earl John Hilton, Chicago, Ill., assignor of one-third to Wilfred S. Stone

Application August 14, 1946, Serial No. 690,440

18 Claims. (Cl. 164—114)

This invention relates to a method of identifying an invoice, particularly a duplicate of an invoice or charge ticket, in a sale where delivery is completed to a purchaser who may not be known to the party making the sale and where the purchaser does not pay for the merchandise. This invention also relates to a machine for making the invoice or charge ticket.

This invention, and its usefulness, can be best understood by describing a preferred application. Large oil companies establish charge accounts for financially responsible customers and they provide each customer with a credit card. A credit card is the instrument utilized by a central credit department to safeguard sales on credit. It is an identification and authorization for which the central issuing office will accept responsibility for reimbursing the station making the delivery. The credit card has an expiration date and frequently has a life of only three months, necessitating replacement four times a year.

The credit card under present practice affords little protection to either the customer or the oil company for several reasons. Firstly, there is no way of making certain that the bearer of the card is its true owner. The oil company may have an instruction to station attendants to require the purchaser to sign his name on the sales slip and to compare the signature with the signature on the credit card. Quite apart from the fact that a station attendant is not competent to judge the similarity of signatures, there is the fact that generally the signature on the sales slip is applied by the driver while sitting in the car, resulting in anything but a true signature. Secondly, there is no way of compelling the station attendant to require the customer to present the credit card. In the case of one large company, more than one-half of the sales are made by station attendants to automobiles known to them. The automobiles may be brought in by a son or daughter and the station attendant makes out the charge slip, with or without signature, and without any presentation of the credit card. The result of this practice is that when a company wishes to terminate customer's credit, it has difficulty in doing so. The customer keeps on buying gasoline on credit even though he hasn't got an active credit card. As an incident to this difficulty there is the fact that frequently owners do not want gasoline and oil charged to their account by some other member of the family even though the gasoline and oil are placed in the credit card owner's car. It would be a distinct feature of a credit card system to limit sales to the person to whom the credit card is issued, i. e., to be able to assure him that neither his wife or his children, who may be on separate accounts, could charge without his loaning them the credit card on his account.

Thirdly, the slips made out by station attendants frequently contain errors as to identification of the person to be charged. If the billing were done locally, this would not be serious, but the large oil companies bill from a central office and there may be as many as 50,000 active accounts. Where there are so many accounts, surnames must be clearly spelled and all initials must be present. A failure to properly identify a charge slip results in correspondence between a home office that may be one thousand miles away and a station attendant or a customer. This is expensive and renders costly a system dealing with charges that may average only a dollar or a dollar and one-half per slip. Fourthly, the present sales slips present a tremendous sorting problem to the home office. Under present practice, a given station will make up a periodical report on the number of charge sales, which report will be accompanied by the duplicate sales slips. From this report, the particular station is credited by the parent company for gasoline sold by it but not paid for. The sales slips must then be placed in alphabetical order. One company having 50,000 active accounts has over 300,000 sales slips a month. This sorting problem has been reduced for another company by the employment of tabulating machines and punch cards. Under this system, a punch card is made up from each sales slip when received, and then by using the punched card, the company can, in conjunction with tabulating machines, collect all of the charges for a given customer, or all of the charges in a given company district. It will be noted, however, that under this system if the sales slip is inaccurate the problem of identification at the time of making out the punch card remains. It will also be noted that making up the punch cards is a costly step.

The general object of this invention is to eliminate all the difficulties excepting the first listed above. More specifically, the object of this invention is to make out at the point of sale a duplicate sales slip which will positively identify the person obtaining the merchandise as a holder of an authorized credit card, and which duplicate sales slip (sometimes called herein "invoice"

or "charge ticket") will be capable of rapid mechanical sorting.

The invention as described below follows the oil company illustration given above, but it is applicable to any business where a customer is to be extended credit by a person who may not know the customer, particularly where the goods are to be delivered to the customer immediately. Thus, in the case of a department store, in order to obviate the guess system of "OK-ing" a check on a carry-out sale, by the head of the department, the customer will have one of applicant's credit cards which upon presentation will enable the clerk to identify the purchaser by mechanical means on the duplicate invoice, which will be capable of a mechanical sorting.

The second defect listed above resides in the inability under present practice to compel the station attendant to demand a presentation of the credit card from the customer—something which is particularly difficult where the customer is well-known to the attendant. The first specific object of this invention is to provide a machine for making a duplicate sales slip which can only be functioned properly when the credit card is also in the machine.

The second specific object of this invention is to provide a machine which will transfer or interpolate or interpret identifying indicia on the credit card on one or more of the sales slips so that the station attendant cannot confuse identification of the purchaser in any way. A feature of this invention is a machine which utilizes continuous-form sales slips in quadruplicate. In order to function the machine properly, the attendant must place the credit card on a credit card table on the machine. When the credit card is in this position and the machine is functioned, the identifying indicia on the credit card are automatically transferred to one or more of the sales slips.

A third specific object of this invention is to reduce the fourth defect heretofore mentioned, namely, the great sorting problem in the central credit office. A feature of this invention is the utilization of the marginal punching or slotting of one or more of the sales slips. As a matter of practice, applicant places the punches or slots along one margin only so that by use of a manual selector, the sales slips can be classified by number, and consequently by name, very rapidly. This arrangement has the great advantage of making it possible in the home office to utilize a duplicate of the credit card issued to the customer as a means of providing the customer with a proper receipt for payments made from month to month, or for any other matter which is personal to the customer's account and which should be sent out to him. Such home office credits can then be mechanically sorted to the account affected with the same accuracy as is possible with sales slips.

Sorting of marginal punched cards is old, although slitting one edge of a continuous-sales form is so far as applicant knows new. It might be helpful to explain here how the sorting of marginal-punched cards is done. In the home credit office, a group of perhaps 250 punched credit slips will be placed in a flat tray with the marginally punched side up. A manual selector resembles an ice pick and is used by successively pushing the selector through the aligned holes and slots on the slips. For a given sort, the cards having slots drop down. It should be understood that the use of other types of indicia may be developed for implementing applicant's invention. Thus, the use of printed indicia on the credit card might be used in conjunction with a photocell. Applicant employs punches because it is least likely to add sales resistance, being old, to a new system which is being introduced.

As for the first problem incident to the use of credit cards, namely, making certain that the bearer of the card is the owner of the card, or that the card is a presently valid card, applicant's system in part solves this problem. At the present time the color of the credit card indicates the period for which it is good. Thus, the company issuing credit cards quarterly may use the four colors, red, green, blue, and yellow, one for each quarter. This still permits some leeway for fraud. Applicant provides the cards for each period with locator holes which seat over posts on the credit card table of the machine. The position of these posts will be changed by station supervisors at the beginning of each quarterly period and the cards for the new period will have holes positioned so as to receive the posts. This means that when the company wishes to close off the credit of a customer, it can effectively do this at the beginning of a quarterly period and neither the customer nor any good will of the station attendant can defeat the intention of the company's home credit office for controlling credit operations.

As presented, this invention may be said to comprise two embodiments of the method of making an invoice and two embodiments of the machine for making the invoice. These are not presented here in equal detail. As for the two embodiments of the method, in the first embodiment, the significant numbers are indicated by slots extending to the edge of the sales slip whereas in the second embodiment all numbers excepting the significant numbers are indicated by slots. The difference between these two methods is observable in sorting. Where the significant numbers are indicated by slots, in sorting, the vast majority of invoices must be raised each time a sort is made whereas under the second method, only those invoices bearing numbers which one seeks must be raised. This latter system reduces the number of invoices that must be lifted each time a sort is made.

It will be appreciated that while this machine shows the punching of one margin only, where necessary other margins could be punched.

Such other objects as may hereinafter appear are described in conjunction with the drawings comprising four sheets, in which:

Fig. 1 is a face view of the credit card;

Fig. 2 is a schematic representation of the first method of transferring information on the credit card mechanically to an invoice;

Fig. 3 is a face view of a punched duplicate invoice;

Fig. 4 illustrates the method of sorting the invoices;

Fig. 5 is a plan view of the invoice-making machine;

Fig. 6 is a front view of the machine, partly in section;

Fig. 7 is a view taken on the line 7—7 of Fig. 5;

Fig. 8 is a view illustrating the lever trains for functioning the punches and dies;

Fig. 9 illustrates the relationship of the hole punch and the slot punch to an invoice positioned in the machine when just a hole is to be punched, while Fig. 10 illustrates the relationship of the hole and the slot punch to each other and to the die when a slot is to be punched;

*The method of making an invoice*

Figure 11:
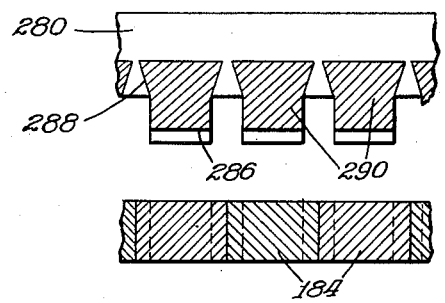
Fig. 11 is a view taken on the line 11—11 of Fig. 7 and shows a portion of the punch plate.

Applicant desires to place mechanically on a carbon copy of an invoice certain identifying information from a credit card and the information on the invoice must be in such physical form that it will make possible mechanical sorting of the invoices. Applicant uses holes and slots positioned on one margin of the duplicate invoice as these make possible manual selector sorting. The positions of the holes on the credit card are not important but positioning them on one margin of the duplicate invoice is very helpful in sorting.

Referring to Fig. 1, the numeral 10 is a credit card which an oil company has issued to John Jones. The card 10 bears the number 1-2-2461. The first of these numbers is used by the oil company for the issuing district control. The second number is used for the cycle under which the account is going to be billed or the credit division that handles the particular account.

The holes such as 12 and 14 indicate the numerals 1 and 2 of the card number by virtue of their position with respect to the edge 16 of the card. Shown above the numbers 12 and 14 are two groups of the numerals 7 4 2 1, spaced by a single 1. This combination of figures makes it possible to indicate any number through nine by punching any one of the significant figures or combinations thereof, i. e. 1 and 2 for 3; 1 and 4 for 5; 2 and 4 for 6; etc. Thus, the hole 12 indicates the 1 and the hole 14 indicates the 2. The single number 1 marked by the numeral 15 will be used to indicate tens for any single group. If the "1" is to be used with the lower lefthand group, a punch under this "1" and the "1" in the group means "11." In fact, the numbers will not be written on the credit card. Similarly, along the top edge 18 of the card there are four groups of the numerals 7 4 2 1 which from left to right spell out the number 2461, and can easily be read for verification purposes in locating the account.

Referring to Fig. 3, the numeral 20 is the face of an invoice which may be one of the carbon copies of an original invoice made out by a station attendant. Referring to Figure 2, the roll 22 is made up of three narrow invoices such as the original invoice 24, which has a width extending from the edge 26 to the edge 28 and a fourth strip of invoices 30. The duplicate invoice 30 has the same size and shape as the single invoice 20 but the invoice 30 is in a strip interleaved with strips of three other invoices which are not punched or slotted, all four of which are in a roll. Hereinafter in the description of the machine, an invoice just like 20 or 30 bears the numeral 88 because it is part of a fanfold. Along the upper edge of this invoice 20, Fig. 3, or strips of invoices 30, Fig. 2, there are positioned six groups of the four-figure combination 7 4 2 1 and one group of "1" only. The invoices 30 as they come from the roll 22 have only the series of numbers indicated by the arrow 32 thereon—they are unpunched.

Applicant's method of making an invoice is to punch a hole such as 34 above and adjacent to each one of the numbers provided the number is not significant, that is, not one of the numbers of the credit card presented, which in this case is 1-2-2461. In the case of the significant numbers, a slot through to the margin of the duplicate invoice 20 is cut, as indicated by the numeral 36 in Fig. 3. As will appear hereinafter, applicant will provide a machine for this. It should be noted that under this method, the invoice 20 has the holes 34 and the slots 36 punched in it at the time that the original invoice is punched at the station. This arrangement is contemplated because of the present facilities of the manufacturers of continuous forms who do not have equipment assembled for punching a continuous series of holes 34 in each invoice at the time of the printing so that the holes would be on the invoices in the roll 22. Under such a system, all that would be necessary would be to punch out slots adjacent the significant numbers on the invoice 20. As will appear later, an invoice having the holes pre-cut would make it possible to utilize a somewhat simpler punching machine.

When a group of these invoices reach the home office they are sorted by means of a needle 38. The first sort separated all slips for district one, creating the row of slots 57. Referring to Fig. 4, the numeral 40 indicates two to three hundred invoices. In the second sort, the needle is placed through the holes and slots above the numeral 1 bearing the identification 42. By lifting the needle 38, all invoices that had a slot at the position 42 dropped down in the manner shown by the invoices 44 and 46. Those invoices that dropped down were then moved to the rear of the group of invoices 40 so that those invoices on the rear were all characterized by a slot at position 1 or 1 and 2.

This sorting step is repeated for the numerals 2, 4, and 7. The openings such as 48 and 50 are formed by slots in the invoices and it will be noted that 48 includes all the invoices that have a slot in the 2 and adjacent to one portion of 48 is slot 50 resulting from those invoices that have a slot at 2 and 1. The numeral 52 is an opening resulting from the slots adjacent the numeral 4, and of this group of invoices that have the slots for 4 there are a group having slots of 1 evidenced by the opening 54, and a group having slots at 2 evidenced by the opening 56.

The foremost invoice will bear number 1-1-0-0-0-1. Note the long opening 57. When a group of slips from a district is received, most of the slips will be against customers in that district. Hence, the opening 57 indicates that this group of slips came from district number one.

The foregoing method of sorting may be described as separating the group of invoices from the ones that the sort is intended to withdraw, and in each instance the group of invoices is raised. Applicant's system can be reversed by slotting in the invoices shown in Figs. 2 and 3 at all of the non-significant numbers and punching holes at the significant numbers. When invoices of this type are brought into a group as illustrated in Fig. 4, and the needle is pushed through them, each time the needle is raised, only a comparatively few of the invoices will be lifted from the group. This system may be described as withdrawing only the sorted invoices from the group. It will be noted that this latter system does not lend itself to pre-punching of the invoices because under this system, you cannot convert a slot through to the invoice's edge into a hole whereas you can convert a hole into a slot. While this system may turn out to be preferred from the sorting standpoint, it makes necessary a machine which must stamp both holes and slots.

Applicant provides a machine for transferring the significant data on the credit card to the invoice and this eliminates human error.

The invoice machine

Referring to Fig. 5, the numeral 60 identifies a frame comprising a front wall 62, rear wall 64, side wall 66, all mounted on a base 68 having suitable legs such as 70, see Fig. 7. The left side of the frame is open to receive a drawer 72, Fig. 6, which has a hinged lid 74 and which slides along the bottom 68 of the frame. The rear wall of the drawer is indicated by the numeral 78, and the bottom by 76.

Disposed on the top of the frame is a surface or table 80 and that portion of the top which is significant for this device is the expanse extending from an opening or edge 82, Fig. 5, in the table to the edge 84, and this surface is referred to as the invoice-writing surface. Stretched across this surface is a set of invoices of the type shown in Fig. 3, comprising three invoices on top, of which the uppermost is indicated by the numeral 86, all three of which have a width of three and one-half inches, and a bottom invoice 88 which is the invoice to be perforated. It should be understood that the width of the forms may vary and that all copies of invoices could be perforated if the need developed. Applicant prefers to perforate just one copy.

The four duplicate invoices are complementary elements of a continuous form in which perforations 90 separate each set of forms from the adjacent set. At the forward side of each set of forms are pairs of aligned holes such as 92 and 94, Fig. 5. Referring to Fig. 6, it will be noted that the invoices of which the bottom is 88 are fed onto the table over a smooth fixed rod 96 which receives the four forms from three spaced carbon blades 98, 100 and 102. Each carbon blade consists of a wire, referring to Fig. 5, such as 104, positioned at an angle and mounted in a bracket 106. Where three carbons are to be interleaved, the carbon is supplied by a carbon roll 108 which is a three-ply roll. Two of the carbons are fed from one side of the invoices to be interleaved, over blades such as 98 and 100, see Fig. 5, and the other over a blade reversely positioned as 102 in the same figure. The forms themselves, referring to Fig. 6, are passed over the carbon blades from a roll 110 which receives the invoices from a flat-pack strip-form or a flat-pack fan-fold form indicated by the numeral 112, and these are conventional.

Examining now the means of ejecting a set of filled-in invoices, and referring to Figs. 6 and 7, disposed beneath the writing table are a pair of aligned guides 112 and 114 in which is slidably disposed for lengthwise movement an ejector plate 116. Mounted on the forward edge of the ejector plate are a pair of upright studs 118 and 120 which in the position shown in Figs. 6 and 7, penetrate the pairs of holes such as 92 and 94 of the set of invoices on the writing table 80. Centrally of the bottom of the plate 116 is a rack 122 in engagement with an idler gear 124 mounted on a pair of brackets 126 and 128. Mounted on the shaft 130 of the idler gear 124 and keyed to the idler gear is a pinion 132 whose upper surface is in alignment with a rack segment 134 which is mounted on and keyed to the main actuating shaft 136 of the machine. The leading edge 138 of the rack 134 is approximately 45 degrees of arc distant from engagement with the pinion 132, with the result that the lever 140 which actuates the shaft 136 from the knob or handle 142 will move through 45 degrees of arc in a clockwise direction before the ejector plate commences to move.

When the arm 140 is actuated, the ejector plate moves to the right as viewed in Fig. 6, so that the continuous forms will be fully advanced and the perforations 90 shown in Fig. 5, will be brought up to the edge 84 which is in vertical alignment with a knife edge 144. At this moment, the operator will lift the set of forms off the studs 118 and 120 and tear them off along the knife edge 144.

In order that an accurate severing of the invoices may be effected, applicant has mounted the knife 144 pivotally on a pair of posts 146 and 148. Centrally of the blade is provided a thumb rest 150 which may be used to press the sheets downwardly between the blade 144 and the edge 84 of the top of the frame. On the back stroke, the studs automatically relocate themselves because the rear edge is slightly below the top of the writing table so that as the ejector plate moves the rear edge 152 against the leading edge of the four invoices, the invoices are simply cammed upwardly against the bottom of the knife until the studs 118 and 120 reach the pair of holes which have been advanced and into which the studs seat. The upper circumferential edge of each stud is rounded.

So far as applicant knows, he is the first to use floating carbon on a billing machine of the continuous-form type and this has created a certain problem which will now be explained. Being expensive, the carbon paper must be used several times, perhaps twenty or twenty-five, before being replaced off the roll. The carbon from the roll is not punched. When first loading the machine, the carbons and the leading edge of the first set of forms are brought up to the edge 84 of the machine, and either portions of the carbon indicated by the dotted lines 154 and 156 are torn out manually or else the carbon roll 108 is held still and on the first action of the ejector plate 116, the studs 118 and 120 tear out such portions as indicated by the numerals 154 and 156. Thereafter, the ejector plate may be freely operated to eject the invoices while the carbon paper itself remains fixed beneath the writing table 80 by virtue of the fact that the carbon paper roll 108 does not move. In the device here shown, there is indicated in Fig. 5 on the shaft of the carbon paper roll 108, a gear 158 which is engaged by a pawl 160. So long as the pawl 160 engages the gear 158, the carbon roll 108 cannot function and hence the carbon paper will be held beneath the writing table 80 irrespective of movement of invoices out of the machine. The type of carbon roll employed is a square-core type so that the carbon does not slip on the carbon roll shaft. Whenever it is desired to replace the carbon on the writing table, the pawl 160 is disengaged from the gear 158 and on the next actuation of the ejector plate 116, the carbon is advanced with the invoices because the writing on the invoices has frozen the carbon sufficiently to the paper to provide a grip.

Applicant shows here a pawl and gear for controlling the carbon roll, but it is contemplated that the device will be provided with an automatic release which upon functioning of the lever arm for a selected number of times such as twenty, will permit the carbon to be advanced. The carbon will automatically be replaced every twenty times. Oil station attendants are not likely to exercise the necessary care to make good carbons. Applicant's system of using carbon sheets is to be contrasted with that employed in other billing machines where the carbons are run transversely of the continuous form from rolls positioned in transverse alignment with the writing table.

The mechanism for transmitting from the credit card the information thereon to the fourth invoice is functioned by the lever arm 140 on the first 45 degrees of arc advance movement. The lever trains will first be described. Referring to Figs. 6 and 7, there is mounted on the shaft 136 a cam 162 which engages the lever 164 pivotally mounted on brackets 166. When the handle 142 is in the normal or retracted position shown in Fig. 6, the cam 162 has depressed lever 164 to the maximum extent. In this position the end 168 is holding upwardly a bar 170 which is mounted on bell crank levers 172 and 174, see Fig. 6, which are pivoted along the axis 176 to a support 178 and the side wall 66 respectively. Disposed between the upper ends of the bell crank levers 172 and 174 is a bar 180, which may be described as a bail, and which is engageable with lugs such as 182. This assembly including the bar 180 will be referred to as the restoring bail. The lugs 182 depend from separate dies such as 184 hereinafter described. Pivotally mounted on the upper arms 186 and 188 of the bell crank levers 174 and 176 are a pair of links of which only one is shown in the drawings, namely 190, in Fig. 7. These links at their outer ends engage a cross bar 192. Each link has a slot 194 in which rides a bar 196 extending between the two links. At each end of the bar 196 are pivotally mounted links 198 and 200, which are duplicates of links not shown. Connecting the links 198 and 200 with the corresponding pair of links are bars or bails 202 and 204 which engage the upper side of sets of latches indicated by the numerals 206 and 208.

In functioning this lever train, immediately after the lever 140, see Fig. 6, is advanced clockwise, the lever train terminating in the restoring bail 180 and the bails 202 and 204 are released because a spring 210 moves the bell crank levers 172 and 174 in a clockwise direction into dotted line position 212 and in so doing, the links 190 move to the right and raise the links 198 and 200 and their corresponding links. The bars 202 and 204 need rise but only about one-eighth of an inch.

The second linkage operating off of the main shaft 136 commences with a cam 214 which engages one end of a lever 216 pivoted at 218 to the brackets 166. The other end of the lever 216 is pivotally connected to a cross bar 220 at the outer ends of which, see Fig. 6, are pivotally connected links 222 and 224. To the upper ends of the links 222 and 224, see Fig. 6, are pivotally mounted arms 268 and 270 which are keyed to opposite ends of the shaft 272 rotatably mounted in posts 274 and 276, which are fastened to the frame of the machine. Mounted on the shaft 272 and extending substantially the entire distance between the posts 274 and 276 is the cam 278, the bottom of which engages a punch plate 280. This punch plate, referring to Fig. 5, has a pair of shoulders 282 and 284 at each end which are machined to act as guides on the sides of posts 274 and 276. Springs, not shown, urge the punch plate 280 against the bottom of the cam 278.

Referring to Fig. 5, it will be observed that the front edge of the punch plate 280 overlaps the lower invoice 88 and is adjacent to the edges of the upper three invoices. It will also be noted in this figure that the punches totaling twenty-five (more or less depending upon the forms) are dotted in and they depend from the punch plate as illustrated in Fig. 6. The punches carry the typical number 286.

It is evident that when the arm 140, referring to Fig. 6, has been moved through about twenty-five degrees of arc so that the credit card table has had time to function those latches associated with plungers which pass through holes in the credit card, the cam 214 will engage the lever 216 which will function the cam 278 to depress the punch plate 280. For purposes of clarity, the spacing of the punch plate from the dies is exaggerated. In fact the space between the punches and the dies (hereinafter described) is only one thirty-second of an inch.

Referring to Fig. 7, there is an opening 226 in the table over which is positioned the credit card table consisting of a holding plate 228. This credit card holding plate 228 contains in the particular form here being described a series of holes such as 230 along one long edge of the table, see Fig. 4, and a series of holes such as 232 along the other long edge. Positioned in each one of these holes is a plunger. In holes such as 230 the plunger is long and is of the type indicated by the numeral 234. The lower end of this plunger 234 is pivotally connected to an associated latch such as 206, pivoted on a bar 236 mounted suitably in the frame. In each of the holes such as 232, there is a short plunger such as 238, the lower end of which is pivoted to a latch such as 208 on a bar 240. Pivotally mounted at 242 to the back of the credit card table 228 is credit card table lid 244. In registry with the holes such as 230 and 232, in the credit card table are cylindrical recesses about one-sixteenth of an inch deep such as 246 and 248, these being in the underside of the credit card table lid 244.

The operation of the credit card table is this: the station attendant places the credit card in the position shown in Fig. 5. This credit card bears number 1-2-2461, which is interpreted by the holes indicated on the card. The card also bears registering holes 250 and 252 which seat over posts 254 and 256 securely mounted in the credit card table. At this moment, the plungers 234 and 238 are in their lowermost or retracted position because, referring to Fig. 7, the bars 202 and 204 are holding the latches such as 206 and 208 down, there being at this moment no movement of the lever arm 140. The station attendant now drops the credit card table lid 244 into the position shown in Fig. 7. He then starts the movement of the lever 140 which immediately releases the latches 206 and their latching ends 258 and 260 are urged downwardly by springs 262 and 264. It is evident that wherever there is no hole in a card, the plunger will not move and consequently its associated latch will not move. Where there is a hole in the card, the plunger will move up through the hole in the card into the cylindrical recess in the credit card table lid under the influence of the associated spring with the result that the associated latch will be dropped into a position such as that indicated by the dotted line 266.

Figure 12:
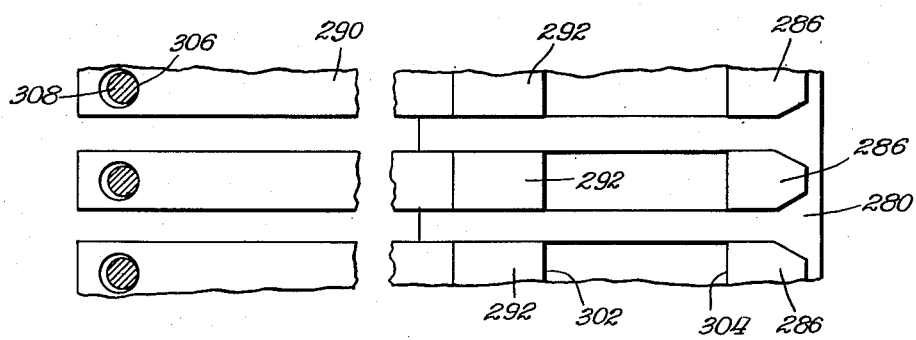
Fig. 12 is a view taken on the line 12—12 of Fig. 7 and shows a portion of the punch plate.

The punch plate 280 has already been generally described including the row of fixed hole punches 286. As heretofore explained, the punched invoice is to have a series of holes, with a slot to the edge at each position where there is a hole in the credit card. This end is accomplished by an auxiliary punch such as 290 (see Fig. 9) movably disposed in grooves transverse to the length of the punch plate on the underside thereof and each in alignment with a fixed punch such as 286. Referring to Fig. 11, there is shown a rear elevation of a portion of the punch plate 280. Grooves or guides 288 open at the bottom are cut in parallel alignment to a point adjacent to the depending hole punch such as 286, see Fig. 9. Sliding in said grooves are elongated punch holders such as 290 from the forward end of which depend punches such as 292. The shape of the punches 292 and 286 are shown in Fig. 12. The punch holder 290 may slide backward and forward in the groove 288 in the punch plate 280. By moving, referring to Fig. 9, the punch holder 290 to the right, the punch 292 may be brought adjacent to fixed punch 286 so that in the bottom invoice 88 lying in the position shown a slot will be cut instead of a hole.

It is, of course, evident that proper cutting of the paper will only occur where there is a reasonably close fit between the punch and the die. It follows that when only fixed punch 286 penetrates the paper, a separate die should be used from that used when both punch 286 and punch 292 penetrate the paper. Applicant effects this by providing a die holder 294 which is elongated and has a width such that referring to Fig. 6, the die holders are side by side and do not require additional spacing means. Referring to Fig. 9, the die holder has a step 296 in its feed edge so that it may move under the table plate 80. Each die holder contains two dies, a smaller die 298 and a larger die 300. In order that the punch holder and the die holder may move equal distances, the punch holder 290 in retracted position is twice the distance from the punch 286 that is necessary in order to clear the edge of the lower invoice 88. More significantly, the edge 302 of the punch 292 is at the mid point of the die 300 and it follows that by moving the punch and the die until the edge 302 of the punch 292 engages the edge 304 of the punch 286, there will be beneath the two punches the die 300 which is large enough to receive both punches. This position is illustrated in Fig. 10.

The other ends of the punch holders such as 290 and die holders such as 294 or 184 are shown in Fig. 7. Each punch holder has an opening 306 in which rides a stem 308 on the upper end of a cross arm at the end of each of the die holders (see also Fig. 12). Returning to Fig. 7, the lower end 310 of each die holder acts as a latch-keeper for the latches 208 and 238. Each die holder is urged to the right by a spring such as 312 which in turn urges the punch holder such as 290 in the same direction. It will be observed that the latches such as 208 are in vertical alignment with some of the latches such as 206. Fig. 8 is a schematic illustration showing how the latches such as 206 are bent to the right while the latches such as 208 are bent to the left.

Referring to Fig. 7, 314 and 316 indicate threaded sockets in the credit card table 228 to either of which the post 254 may be transferred. There are similar sockets on the far side of the table, see Fig. 5, and it is evident that the posts 254 and 256 may be arranged in a wide range of combinations to make it possible to compel the use of newly issued credit cards. The means employed for cutting the fourth duplicate slip 88 may not be the means actually employed by applicant even if the present system of punching is followed for the reason that the punching of the cards must be very clean—the edges of the holes or slots must not be bent out in one direction or frayed or carry burrs of paper. The reason for this is that the rapid sorting is dependent upon the adjacent slips or cards in a group such as that shown in Fig. 4, having absolutely smooth surfaces. If the surfaces are not smooth so that the burrs on a hole tend to catch in the hole of an adjacent card or slip, the retaining wall on a hole may be torn out. Additionally, in order to lift the selected slips from the rejected slips rapidly, the operator must not be hampered by having to separate two adjacent cards or slips. Even the presence of static in the cards reduces the rapidity and accuracy of sorting. Applicant has designed a punch holder and die set which are joined to each other through a flexible member, similar to the punch and die holders used in a conventional notary seal. These punch and die holders may be mounted in side-by-side relationship and there is provision for having one punch move with respect to another punch, both in the same assembly and to accomplish the same purpose disclosed in the apparatus heretofore described.

In the event that applicant elects to punch slots for non-significant numbers and holes for significant numbers, the machine heretofore described may be modified, referring to Figs. 9 and 10, by the simple expedient of having the two punches 292 and 286 shown in Fig. 10, in abutting relationship as the normal position. The lever trains will then be modified so that whenever a hole appears on a credit card, the movable punch holder 290 will be retracted into the position shown in Fig. 9. However, it is not likely that this method will be adopted for the reason that the machine for punching the credit cards can be readily changed so as to punch a hole for non-significant numbers on the credit card, leaving a blank for the significant numbers. Referring to Fig. 1, such a credit card would have a hole punched adjacent to each number where there is not a hole now, and where there are holes in that figure the card would be imperforate. When such a card is placed in the present machine, it would probably function the machine to make slots for the non-significant numbers and holes for the significant numbers.

There are two other ways of making applicant's type of invoice and both of these may come into use under certain circumstances. Firstly, referring to Fig. 2, applicant hopes to at least experiment with rolls or flat-packs in which the holes 34 have been pre-cut. Under such circumstances, referring to Fig. 9, the fixed punches 286 would be eliminated and the movable punches 292 would be doubled in depth, the machine being substantially the same otherwise.

Figure 13:
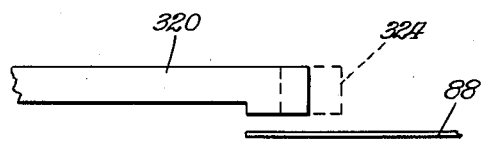
Figs. 13, 14 and 15 are schematic illustrations of an alternative construction; and, Fig. 16 is a perspective view of the invoice machine.
Figure 15:
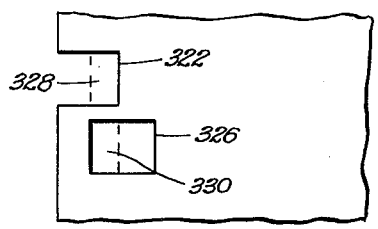
Figure 14:
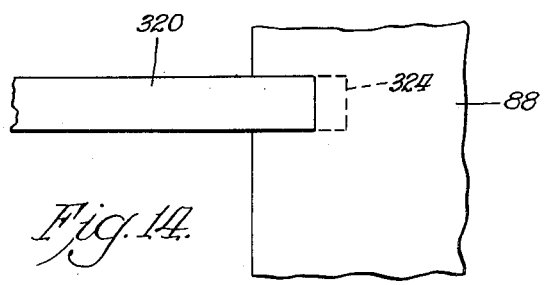

Applicant is also considering use of a punch of a single size such as the combined sizes, see Fig. 10, of the punches 292 and 286, which punch is movable into two positions with respect to the paper. Referring to Fig. 13 and Fig. 14, 88 identifies the slip of paper and 320 identifies a punch which in the position shown will punch the slot such as 322 in Fig. 15. In advance position, indicated by dotted lines 324 in Figs. 13 and 14, the punch 320 will punch a hole 326. It is obvious that the portion of the slot 322 indicated by the area 328 and the portion of the hole indicated by the area 330 will overlap so that a selector may always be inserted through the slots of the holes. This arrangement makes it possible to use one punch and one die, changing only the position of the die and the punch with respect to the edge of the paper. It has the disadvantage of making it necessary to slightly widen the fourth slip, that is 30 of Fig. 2. By this arrangement, to use the machine heretofore described, the credit cards would have to be punched so that the significant numbers were imperforate and all other numbers were represented by holes. It is, of course, evident that the machine could be reversed if the cards were reversed.

Having thus described the invention, what applicant desires to claim is:

1. The method of making a charge ticket from a credit card which comprises the steps of placing significant indicia according to a number code on a credit card, of selecting several positions along an edge of the ticket which may have significance in accordance with the number code, of punching holes through those positions of the ticket that have no significance in a number on a particular credit card employing the same code, and of slotting those positions through to an edge of the ticket which have code significance on the same credit card.

2. The method of making a charge ticket from a credit card which comprises the steps of placing significant indicia according to a number code on a credit card, of selecting several positions along the edge of the ticket which may have significance in accordance with the number code, of slotting those positions of the ticket through to the edge of the ticket which positions have no significance in a number on a particular credit card employing the same code, and of punching holes at those positions which have significance on the same credit card.

3. The method of making a charge ticket from a credit card which comprises the steps of placing significant indicia according to a number code on a credit card, of selecting several positions on the ticket equally spaced from each other and in a row spaced from the edge of the ticket which may have significane in accordance with a number code, of punching holes through those positions on the ticket that have no significance in a number on a particular credit card employing the same code, and of slotting those positions through to an edge of the ticket which have code significance on the same credit card.

4. A machine for making a business form comprising means for holding the form, means for holding removably but accurately a device having identifying coded indicia thereon, and means responsive to the identifying indicia on a device held in the holding means for placing indicia of like significance along an edge of the form.

5. A machine for making a business form comprising means for holding the form, means for holding removably but accurately a device having identifying indicia thereon and having post holes therethrough, and means responsive to the identifying indicia on a device held in the holding means for placing indicia of like significance on the form, said holding means for the identifying device comprising posts fixed on the machine and spaced similarly to the spacing of the holes on the device carrying the identifying indicia for seating said holes over the posts.

6. A machine for making a business form comprising means for holding the form, means for holding removably but accurately a device having identifying indicia thereon, and means responsive to the identifying indicia on a device held in the holding means for placing indicia of like significance on the form, said holding means comprising posts and a plurality of seats for each post.

7. A machine for making a business form comprising means for holding the form, means for holding removably but accurately a device having identifying coded indicia thereon, a testing element on the device holding means for checking the presence of indicia on an identifying device in the holding means, and means responsive to said testing element for placing indicia of like significance along an edge of the form.

8. A machine for making a business form comprising means for holding the form, means for holding removably but accurately a credit card having significant coded cut-out portions, plungers in said latter holding means adapted to penetrate cut-out portions of a credit card held in proper position, and means responsive to those plungers which penetrate a cut-out portion on a credit card for punching significant indicia along an edge of the form.

9. A machine for making a business form comprising means for holding the form, means for holding removably but accurately a credit card having like sized and shaped holes punched at selected significant points therethrough, plungers movably mounted on said credit card holding means and adapted to engage all possible holes in said credit card, said plungers being of a cross-sectional size adapted to penetrate holes in the credit card, and means responsive to those plungers which penetrate a cut-out portion on a credit card for punching significant holes and slots along an edge of the form.

10. A machine for making a business form comprising means for holding the form, means for holding removably but accurately a credit card having like sized and shaped holes punched at selected significant points in a row along one margin thereof, a row of plungers movably mounted on said credit card holding means and adapted to engage all possible holes in said credit card, said plungers being of a cross-sectional size adapted to penetrate holes in the credit card, and means responsive to those plungers which penetrate a cut-out portion on a credit card for punching significant holes and slots along an edge of the form.

11. A machine for making a business form comprising means for removably but accurately holding a device having identifying indicia thereon, elements associated with said holding means for testing the presence of significant indicia on a device held therein, means for holding a form on the machine, and means responsive to the actuation of said testing elements for slotting an edge of the form in a manner having like significance with the indicia on the device in the holding means.

12. A machine for making a business form comprising means for removably but accurately holding a device having identifying indicia thereon, elements associated with said holding means for testing the presence of significant indicia on a device held therein, means for holding a form on the machine, means for punching holes in the form at predetermined positions, and means responsive to the actuation of said testing elements for slotting such holes to the edge of the form as will give a significance identical to that of the indicia on the device in the holding means.

13. A machine for making a business form comprising means for removably but accurately holding a device having identifying indicia thereon, elements associated with said holding means for testing the presence of significant indicia on a device held therein, means for holding a form on the machine, means for punching a row of equally-spaced, like-sized holes in the form adjacent one margin thereof, and means responsive to the actuaton of said testing elements for slotting selected holes to an edge of the form as will give a significance identical to that of the indicia on the device in the holding means.

14. A machine for making a business form comprising means for removably but accurately holding a device having identifying indicia thereon, elements associated with said holding means for testing the presence of significant indicia on a device held therein, means for holding a form on the machine, a row of fixed hole punches positioned to punch holes adjacent one edge of the form, a like number of slotting punches, one for each fixed punch, each slotting punch being movable to a point adjacent the associated fixed punch so as to slot the form from an edge to the hole, means responsive to the actuation of a testing element for moving a slotting punch adjacent its associated fixed punch, and means for actuating the punches as thus positioned.

15. A machine for making a business form comprising means for removably but accurately holding a device having identifying indicia thereon, elements associated with said holding means for testing the presence of significant indicia on a device held therein, means for holding a form on the machine, a punch plate having one side overlapping a strip of the form along one edge, a row of similarly-sized equally-spaced punches held by said punch plate and engageable with said form, an auxiliary punch for each fixed punch normally mounted out of engagement with said form, means for moving each auxiliary punch adjacent its associated fixed punch so as to slot the form to the form edge, and means responsive to the presence of indicia at a selected point on an identifying device held in the holding means for moving the auxiliary punch adjacent its associated fixed punch.

16. A machine for making a business form comprising means for removably but accurately holding a card having openings therethrough, means in said holding means for penetrating said openings in a card held therein, means for holding the form, means for punching openings in the form at selected positions, and means responsive to the testing means for slotting an associated hole in the form to the edge of the form.

17. A machine for making a business form comprising a card holding surface, a row of equally spaced, similarly sized plungers individually movably disposed so as to penetrate said surface, means for holding a form, a punch operably connected with each plunger and engageable with an edge of said form, means urging each plunger through the surface of said card holder, and means for causing each punch associated with a plunger that can penetrate the surface of said card holder when a card is in position therein to slot said form.

18. A machine for making a business form comprising means for holding one set of forms of a continuous, multiple-sheet form in writing position, means for interleaving carbon sheet material from a continuous roll parallel to the continuous form, means for holding removably but accurately a device having identifying coded indicia thereon, means responsive to the identifying indicia on a device held in the holding means for placing indicia of like significance on one of the forms of the multple form, and a single actuating lever for functioning said last-named means first and then moving the treated form off of the writing surface for removal from the machine.

EARL JOHN HILTON.

REFERENCES CITED

The following references are of record in the file of this patent:

UNITED STATES PATENTS

| Number | Name | Date |
|---|---|---|
| 1,776,155 | Hildreth | Oct. 14, 1930 |
| 2,132,413 | Gollwitzer | Oct. 11, 1938 |